July 13, 1954  J. D. ALTEMUS  2,683,609
EXTENSIBLE LUGGAGE CARRIER

Filed March 4, 1950  2 Sheets-Sheet 1

INVENTOR:
James Dobson Altemus,
BY
His ATTORNEY

July 13, 1954  J. D. ALTEMUS  2,683,609
EXTENSIBLE LUGGAGE CARRIER
Filed March 4, 1950  2 Sheets-Sheet 2

INVENTOR:
James Dobson Altemus,
BY
W. K. Swenarton,
His ATTORNEY

Patented July 13, 1954

2,683,609

UNITED STATES PATENT OFFICE 2,683,609

EXTENSIBLE LUGGAGE CARRIER

James Dobson Altemus, New York, N. Y.

Application March 4, 1950, Serial No. 147,667

1 Claim. (Cl. 280—35)

This invention relates to attachments for suitcases, small trunks and other articles of luggage that serve to convert the same into miniature hand trucks whereby they can be conveniently transported along side-walks, station platforms, car aisles and elsewhere with a minimum expenditure of energy on the part of the traveler. Other objects of the invention are the provision of an attachment of the aforesaid character, which is compact, sturdy and exceedingly cheap to manufacture and which admits of luggage being opened without removal of the attachment.

It has been proposed, as set forth in Patent No. 1,697,619 to mount opposing clamping members of a luggage carrier on a screw-threaded shaft, whereby such luggage carrier can be removably mounted on an article of luggage. However, not only is the device disclosed in said patent cumbersome but it requires, when applied to a small article of luggage, such as a suit-case, that the same be closed before such luggage can be mounted on the luggage carrier and necessarily, therefore, that the latter be detached from the luggage before it can be opened. This feature, in itself, was a fundamental weakness of the luggage carrier disclosed in said patent and tended to seriously impair its usefulness for transporting luggage, especially suit-cases, as not only do travelers frequently have occasion, while en route, to open their luggage for the purpose of removing toilet and other articles therefrom but the opening of the luggage is mandatory for inspection purposes. Furthermore, unless the luggage can be opened without first detaching the luggage carrier it is not possible to "park" the key of the luggage carrier within the luggage when traveling as is most desirable, if such luggage cannot be opened without first detaching the carrier and if no separate key is required to either attach or detach the carrier to the luggage, as is the case in the construction disclosed in said patent, then the luggage carrier can be surreptitiously removed in the absence of the traveler.

My investigations have led to the discovery of a luggage carrier which, while possessing all the above specified advantages and particularly that when once securely attached to luggage it in no way interferes with the opening and closing of the same in the usual manner while the carrier is still so attached.

My invention is fully set forth in the following detailed description and drawings forming a part thereof, in which latter Figure 1 is a side elevation, on a reduced scale, of a suit-case equipped with my improved luggage carrier;

Figure 1:
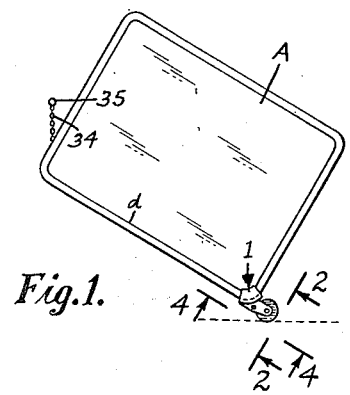
Figure 7:
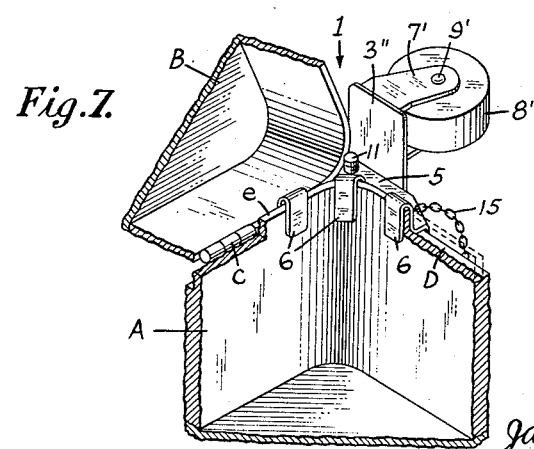
Figure 7 is also an enlarged perspective view showing the manner of mounting the luggage carrier on the body proper of the suit-case while the latter is in an open position.
Figure 2:
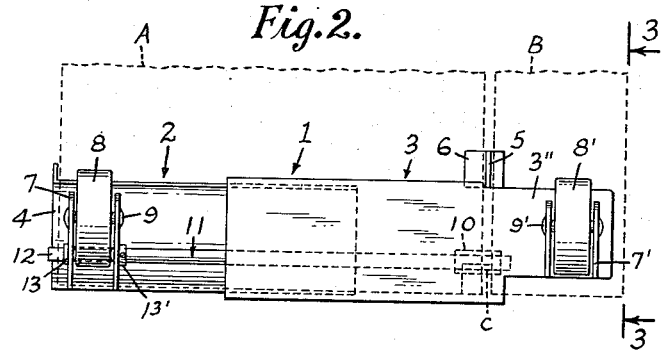
Figure 2 is a plan view, from below, along the line 2—2 of the luggage carrier shown in Figure 1, a fragment of the suit-case being shown in dotted lines.

Referring to the drawings and the construction illustrated therein, A designates the body, B the top, C the hinges and D a shoulder of a suit-case equipped with my improved luggage carrier 1. The reference numerals 2 and 3 designate two slidable, telescoping, supporting members, the latter having its outer edges 3' crimped over the adjacent end of member 2 and also having an extension 3" which serves as a support for one of the caster brackets of the luggage carrier, as hereinafter described. The reference numeral 4 designates the offset closed end of the member 2 and 5 designates the corresponding opposing end of the member 3, the same being provided with U-shaped fingers 6 which are adapted to embrace the rim e of the body A of the suit-case.

A pair of bracket arms 7 and another pair of bracket arms 7' are respectively welded to otherwise rigidly connect to the bottom faces of the member 2 and the extension 3", respectively the same serving to support casters 8, 8' which are rotatably mounted on pins 9, 9' carried by said bracket arms.

An internally threaded boss 10 is spot-welded by a fillet weld 10' to the end plate 5 of the member 3, the same serving to receive and support one end of a shaft 11 whose other end projects through the apertures a formed in the pair of bracket arms 7, the same being of a size to loosely receive said shaft.

Said shaft has a screw thread b formed thereon which extends from one end thereof throughout the greater part of its length, thereby admitting of adjustment of the carrier within wide limits to accommodate the same to various sizes of luggage. The other end 12 of said shaft is of square cross section and is adapted to receive the key, such as a skate key, which when fitted thereon admits of the rotation of said shaft and the to-or-fro movement of the members 2 and 3 with respect to each other to any extent desired.

Collars 13, 13' are pinned on said shaft 11 just outside of said bracket arms 7 and the same serve to retain the shaft against endwise movement with respect to said arms.

Figure 3:
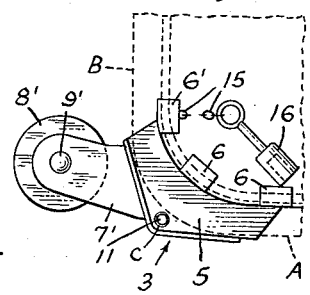
Figure 3 is an end elevation, taken on the line 3—3 of Figure 2.
Figure 4:
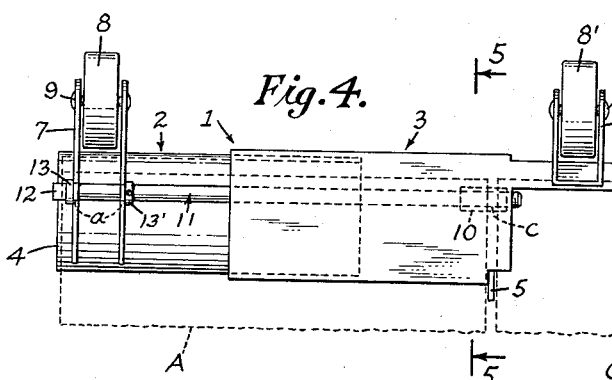
Figure 4 is a longitudinal elevation along the line 4—4 of Fig. 1 of the suit-case and luggage carrier shown in Figure 2 but showing the suit-case with its bottom side up.
Figure 5:
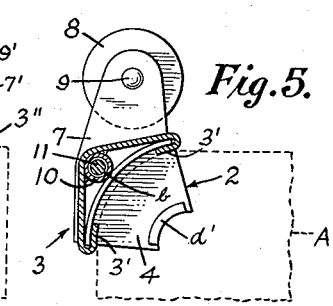
Figure 5 is a vertical section, taken on the line 5—5 of Figure 4.
Figure 6:
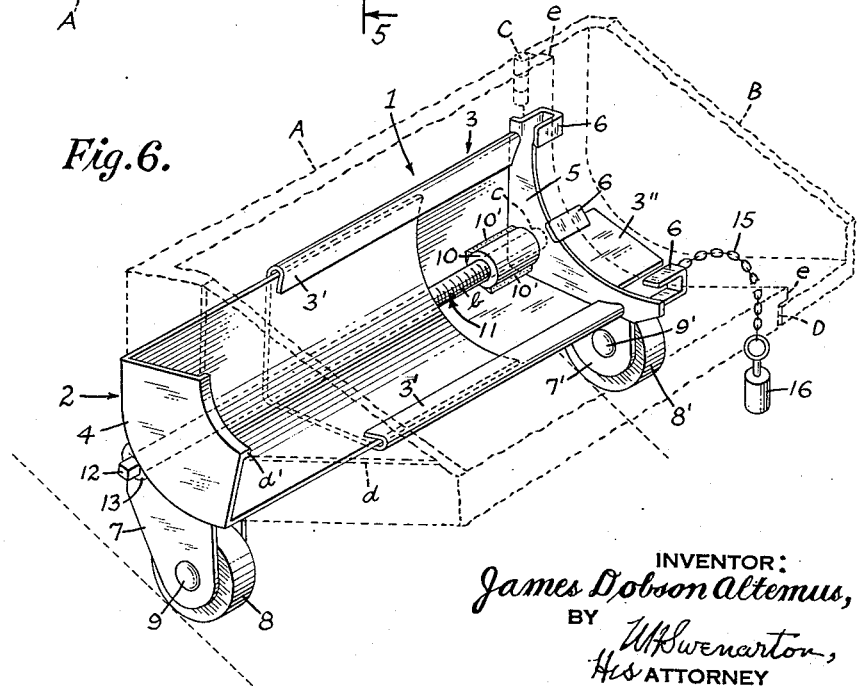
Figure 6 is an enlarged perspective view showing the luggage carrier attached to the suit-case which is partially shown in dotted lines.

A chain 15 which carries a key 16, such as aforesaid, serves to tether the key to the finger 6' while admitting of carrying the same within the luggage when travelling and thereby prevents accidental displacement of such key or surreptitious removal of the carrier at all times. As shown in Figure 3, the end plate 5 has an aperture $c$ through which the threaded end of shaft 11 can be projected during the rotation thereof to contract the width of the tread or wheel-base of the carrier.

The reference letter $d$ designates the trim of the body of suit-case A and $d'$ the offset flanged end of the end plate 4 which is adapted to embrace the edge of such trim when the suit-case is mounted on the carrier. A hand grip 35 is secured to the suit-case by a chain 34.

Having thus described the invention, what I claim is:

An article of luggage composed of two body members hinged together and mounted on a luggage carrier, the latter having two co-operating members slidably associated with each other, roller elements mounted on such carrier, a screw-threaded member, serving to effect relative to-and-fro adjustment of said slidably associated members, mounted on such carrier and inturned finger elements carried by one of said slidably associated members and firmly gripping the rim of one of said hinged members in such a manner as not to interfere with the opening and closing of the said hinged members while the same are mounted on the carrier.

References Cited in the file of this patent

UNITED STATES PATENTS

| Number | Name | Date |
|---|---|---|
| 1,276,067 | Hurd | Aug. 20, 1918 |
| 1,642,094 | Sviageninov | Sept. 13, 1927 |
| 1,697,619 | Sviageninov | Jan. 1, 1929 |
| 1,788,150 | Curtin | Jan. 6, 1931 |
| 2,446,023 | Pohl | July 27, 1948 |